United States Patent [19]

Gonnering et al.

[11] Patent Number: 4,896,288

[45] Date of Patent: Jan. 23, 1990

[54] PROGRAMMABLE CONTROLLER INPUT MODULE

[75] Inventors: Roger Gonnering, Glendale; Anthony G. Gibart, Milwaukee, both of Wis.

[73] Assignee: Allen-Bradley Company, Inc., Milwaukee, Wis.

[21] Appl. No.: 361,740

[22] Filed: May 31, 1989

Related U.S. Application Data

[63] Continuation of Ser. No. 12,566, Feb. 9, 1987, abandoned.

[51] Int. Cl.$^4$ .......................... G06F 3/00; G06F 3/02
[52] U.S. Cl. .......................... 364/900; 364/926.93; 364/927.99; 364/926.9; 364/949; 364/942.7; 364/941.1; 364/565; 364/569; 364/142; 364/167.01; 318/603
[58] Field of Search ............... 364/200, 900, 130–139, 364/167, 141, 142, 146; 318/606, 603

[56] References Cited

U.S. PATENT DOCUMENTS

| | | | |
|---|---|---|---|
| 3,810,118 | 5/1974 | Kiffmeyer | 340/172.5 |
| 3,828,318 | 8/1974 | Bennett et al. | 364/146 |
| 3,942,158 | 3/1976 | Dummermuth | 340/172.5 |
| 4,165,534 | 8/1979 | Dummermuth et al. | 364/900 |
| 4,170,791 | 10/1979 | Daughton et al. | 364/900 |
| 4,442,504 | 4/1984 | Dummermuth et al. | 364/900 |
| 4,470,108 | 9/1984 | Kato et al. | 364/142 |
| 4,561,049 | 12/1985 | Deleganes et al. | 364/130 |
| 4,602,324 | 7/1986 | Fujawa et al. | 364/130 |
| 4,638,452 | 1/1987 | Schultz et al. | 364/900 |
| 4,639,884 | 1/1987 | Sagues | 364/565 |
| 4,642,760 | 2/1987 | Yanai et al. | 364/143 X |
| 4,715,009 | 12/1987 | Böhmler et al. | 364/565 |
| 4,744,022 | 5/1988 | Kumar et al. | 364/142 |
| 4,745,744 | 5/1988 | Cherry et al. | 364/132 X |
| 4,751,442 | 6/1988 | Kurakake | 364/131 X |
| 4,774,446 | 9/1988 | Salazar et al. | 318/603 X |

*Primary Examiner*—Eddie P. Chan
*Assistant Examiner*—P. V. Kulik
*Attorney, Agent, or Firm*—Quarles & Brady

[57] ABSTRACT

A high-speed input module for a programmable controller has two sensor inputs, one for receiving an indication of a sensed event and another or receiving an indication as to whether the count of such events should be incremented or decremented. Each input is coupled to a separate data latch which temporarily stores the respective indication. The output of the sensed event latch is connected to an interrupt line of the programmable controller. A shift register has a separate parallel input connected to the output of each latch and has a serial output for connection to a data input terminal of the programmable controller. The shift register transfers the sensed indications to the controller in response to clock signals received from the programmable controller.

14 Claims, 5 Drawing Sheets

PROGRAMMABLE CONTROLLER INPUT MODULE

This application is a continuation of application Ser. No. 012,566, filed 2/9/87, now abandoned.

The present invention relates to programmable devices for controlling various pieces of equipment and particularly to data input modules for such controllers.

BACKGROUND OF THE INVENTION

Programmable Controllers are typically connected to industrial equipment such as assembly lines and machine tools to sequentially operate the equipment in accordance with the stored program. In Programmable Controllers such as those disclosed in U.S. Pat. Nos. 3,810,118; 3,942,158; 4,165,534; and 4,442,504 for example, the control program is stored in a memory that includes instructions which are read out in a rapid sequence and executed to examine the condition of selective sensing devices on the controlled equipment, or to energize or de-energize selected operating devices on the controlled equipment, contingent with the status of one or more of the examined sensing devices.

The sensing devices and operating devices on the controlled equipment are connected to the programmable controller through input and output circuits. Often the sensing devices are limit switches which are closed when a portion of the controlled equipment moves to a given position or when an article that is being manufactured passes by a point on the assembly line. The sensing device closes a switch allowing an electric current to flow back to the programmable controller. Typically the sensing device switches an alternating current having a frequency equal to the line current of the power supply to the programmable controller, which in the United States is 60 Hz. This limits the frequency at which the switch may be opened and closed to no greater than about one half of the line frequency or 30 closures per second in order for each closure to be detected. While this is adequate for most operations of the controlled equipment, some sensors produce output signals at a much higher frequency requiring a different type of input to the programmable controller.

One type of such sensing devices which produce output signals having a higher frequency are position encoders. The encoder has a shaft which is connected to the piece of equipment being controlled so that the shaft will rotate in response to the movement to be sensed. This movement may be rotational such as from the shaft of an electric motor or linear with a mechanism to convert it to rotational motion for sensing. Conventional encoders produce two pulsed output signals in response to the rotation of the shaft. The two signals are in quadrature so that the pulses of the two signals are 90 degrees out of phase. By determining which one of the two signals is leading the other, the direction of the shaft rotation may be determined; and the number of pulses per unit of time determines the speed at which the shaft is rotated. Typically, the frequency of the encoder signal is greater than 60 Hz rendering conventional programmable controller inputs incapable of handling the encoder's output.

SUMMARY OF THE INVENTION

The programmable controller has an interrupt input, a clock signal output, and serial input and output. An input module for such a controller includes a first input terminal for receiving a signal indicating the occurrence of an event to be counted and a second input terminal for receiving a signal indicating whether the count is to be incremented or decremented. Apparatus is provided for connecting the first input terminal to the interrupt input of the controller and for storing the indication of whether the count is to be incremented or decremented. Additional circuitry connects the output of the storage means to the serial input of the controller in response to a clock signal from the controller.

In variations of the basic input module both the event and the direction indications are parallel loaded into a shift register having an output connected to the serial input to the controller. Several such modules may be daisy chained together with subsequent ones having their shift register output connected to a serial input of the shift register for the module next closest to the controller. The controller receives data by causing them to be shifted through the modules.

An object of the present invention is to provide a device for interfacing conventional programmable controllers to high speed sensors. It is also a feature for the instant modules to provide a mechanism for connecting several modules to a single serial input of the controller while still enabling the controller to distinguish the data from each module.

DETAILED DESCRIPTION OF THE INVENTION

Figure 1:
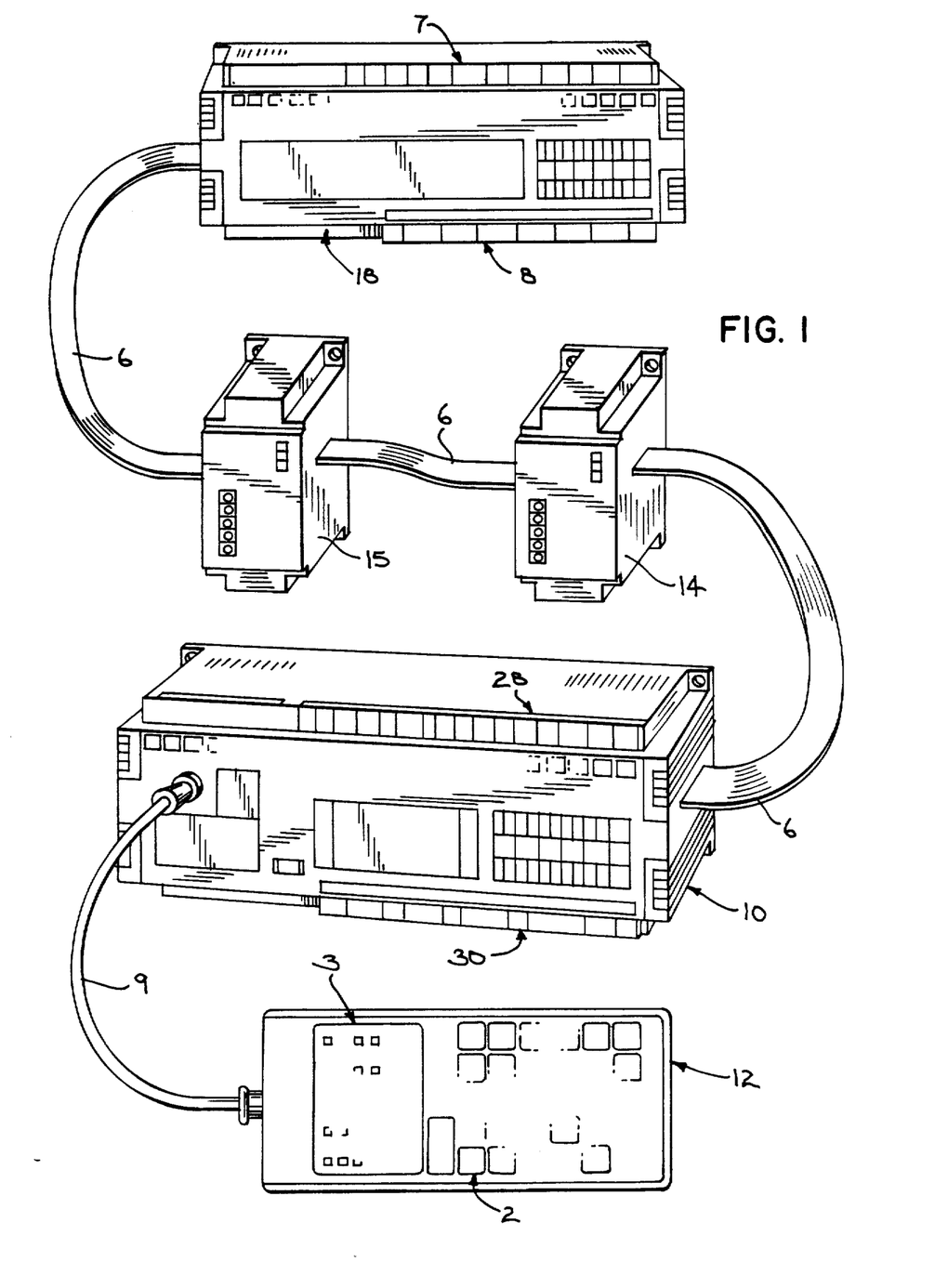
FIG. 1 is a pictorial representation of a controller system incorporating the present invention.

With initial reference to FIG. 1, a system for controlling a piece of industrial equipment comprises a computer-based programmable controller 10, a programming module 12, two high-speed input modules 14 and 15, and a device input/output (I/O) expansion module 18. The conventional programmable controller 10 stores a user control program which is executed when the system is in the "RUN" mode to examine the state of various sensing devices connected to a set of ten input terminals 28 and to operate output devices connected to a set of six output terminals 30.

The various system I/O components are connected through cables 6 which contain two buses, one for the high-speed input modules and another connecting the device expansion modules to the controller 10. The expansion module 18 provides ten additional input terminals 7 and six additional output terminals 8. Additional device expansion modules can be chained together to increase the number of input and output points. Each of the inputs 28 and 7 of the controller and expansion modules are conventional ports for use with various sensors that switch an electrical signal from the system which has a frequency equal to that of the power line frequency. Up to four high-speed input modules (HSIM) may be chained together between the controller 10 and the first device expansion module 18. Each HSIM interfaces the controller to a high-speed sensor such as a shaft encoder (not shown). Although a greater number of HSIM's could be attached, because they interrupt the processor 20 when they have data to send, too may modules will greatly reduce controller's operating speed.

The programming module 12 is small enough to be held in the user's hand and connects via cable 9 to the programmable controller 10. The programming module includes a keyboard 2 through which the user may enter and edit a control program, and a display 3 which enables the user to examine the control program. When the controller 10 has been programmed, the programming unit may be disconnected and used on other systems.

Figure 2:
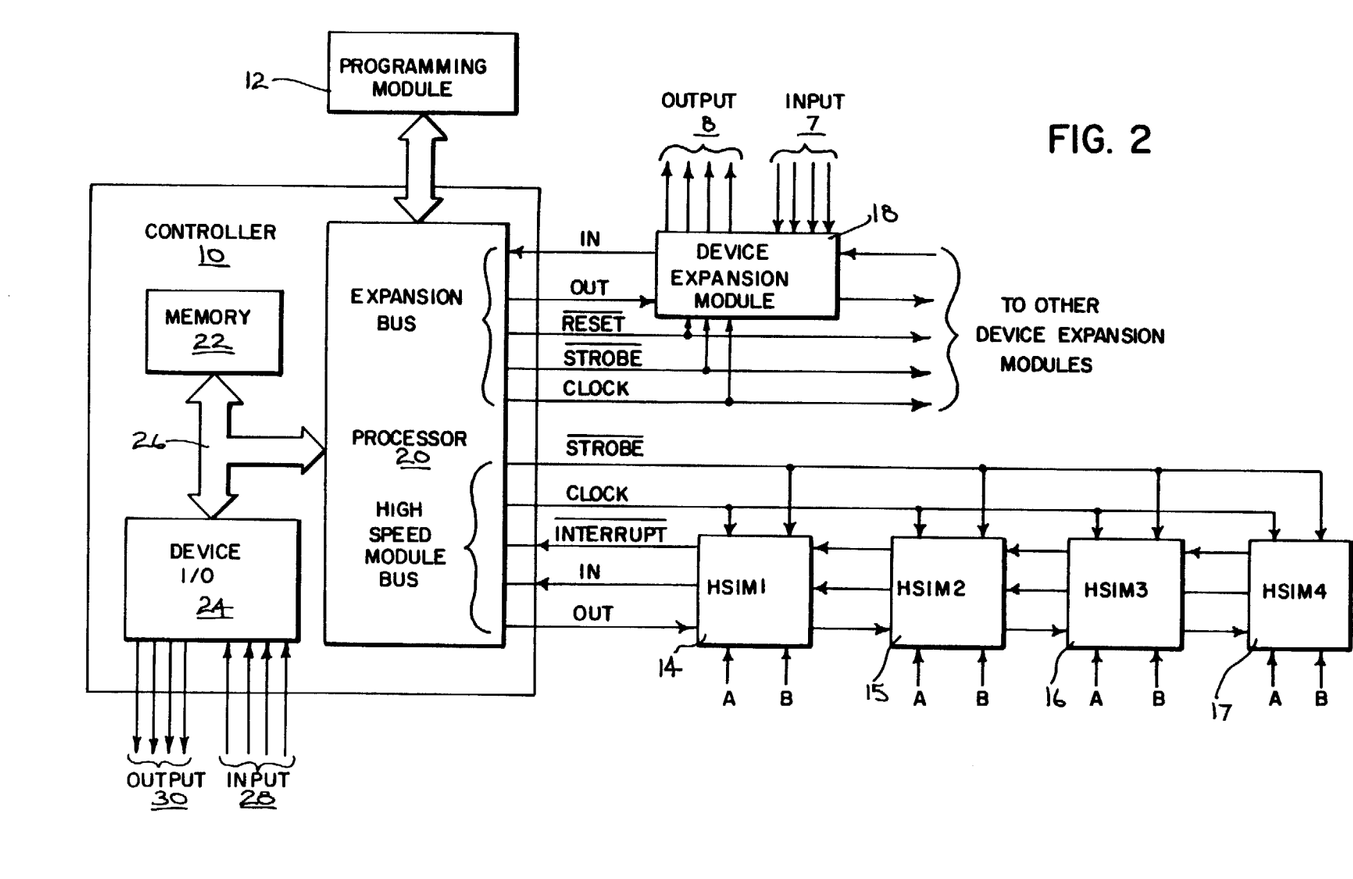
FIG. 2 is a block diagram of a programmable controller and its associated input modules.

The electrical connection of the various components in the controller system are shown in FIG. 2. The programmable controller 10 includes a processor 20 which may consist of any of several well-known microcomputers. Within the controller are also a memory 22 and a device input/output (I/O) interface 24, both of which are connected to the processor 20 via bus 26. Bus 26 may actually comprise a number of buses for transmitting addresses, data and control signals among the various components within the controller. The device I/O interface 24 receives relatively low-speed sensor signals on input lines 28 and buffers them for operation by the processor 20. The inputs 28 may be connected to limit switches which switch 12 to 120 volts of alternating current at the line frequency of the power to the controller. The interface 24 also receives output signals from the processor and converts them into the proper electrical signals for operating control devices coupled to output lines 30. Only a few input and output lines are shown on the controller 10 in FIG. 2 for simplicity.

An expansion bus and a high-speed module bus are both connected directly to ports of the processor 20 for transmitting and receiving data to and from various external modules such as elements 14–18. Specifically, in instances where the number of input and output lines on the device I/O interface 24 is insufficient to provide the necessary low-speed input and control signals for the piece of manufacturing equipment, one or more device expansion modules such as module 18 may be connected to the expansion bus. The expansion bus consists of serial input (IN) and output (OUT) lines and three control lines consisting of an $\overline{\text{RESET}}$, $\overline{\text{STROBE}}$ and CLOCK signal lines. The $\overline{\text{STROBE}}$ line carries a signal that enables the expansion module to send and receive data being clocked over the IN and OUT lines of the bus. Each of the input and outputs 7 and 8 of the device expansion module 18 is similar to those of the controller's I/O interface 24 and receive relatively low-speed input signals operating at the line frequency of the power to the controller 10. A low or a high voltage level on the input lines 7 to the device expansion module 18 represents a logical zero or one bit, respectively, which is temporarily stored in the module for transmission to the controller 10.

Periodically during the execution of the program in controller 10, the processor accesses the expansion bus and applies proper control signals on the $\overline{\text{STROBE}}$ and CLOCK lines to serially shift in the bits from each of the input lines to the modules 18. Similarly, periodically the processor accesses the device I/O interface 24 to read its input bits on lines 28. During other portions of the controller program, data bits are sent out to the device expansion module 18 and the device I/O interface 24 to activate or deactivate the various operating devices connected to the respective output lines.

The system in FIG. 2 is shown with a full complement of four high-speed input modules 14–17 connected to the lines of the high-speed module bus of processor 20. This separate bus also has serial input (IN) and output (OUT) lines, as well as lines for $\overline{\text{STROBE}}$, $\overline{\text{INTERRUPT}}$ and CLOCK signals. The $\overline{\text{INTERRUPT}}$ line of the HSIM bus is connected to an interrupt terminal on processor 20.

HSIM Circuit

Figure 3:
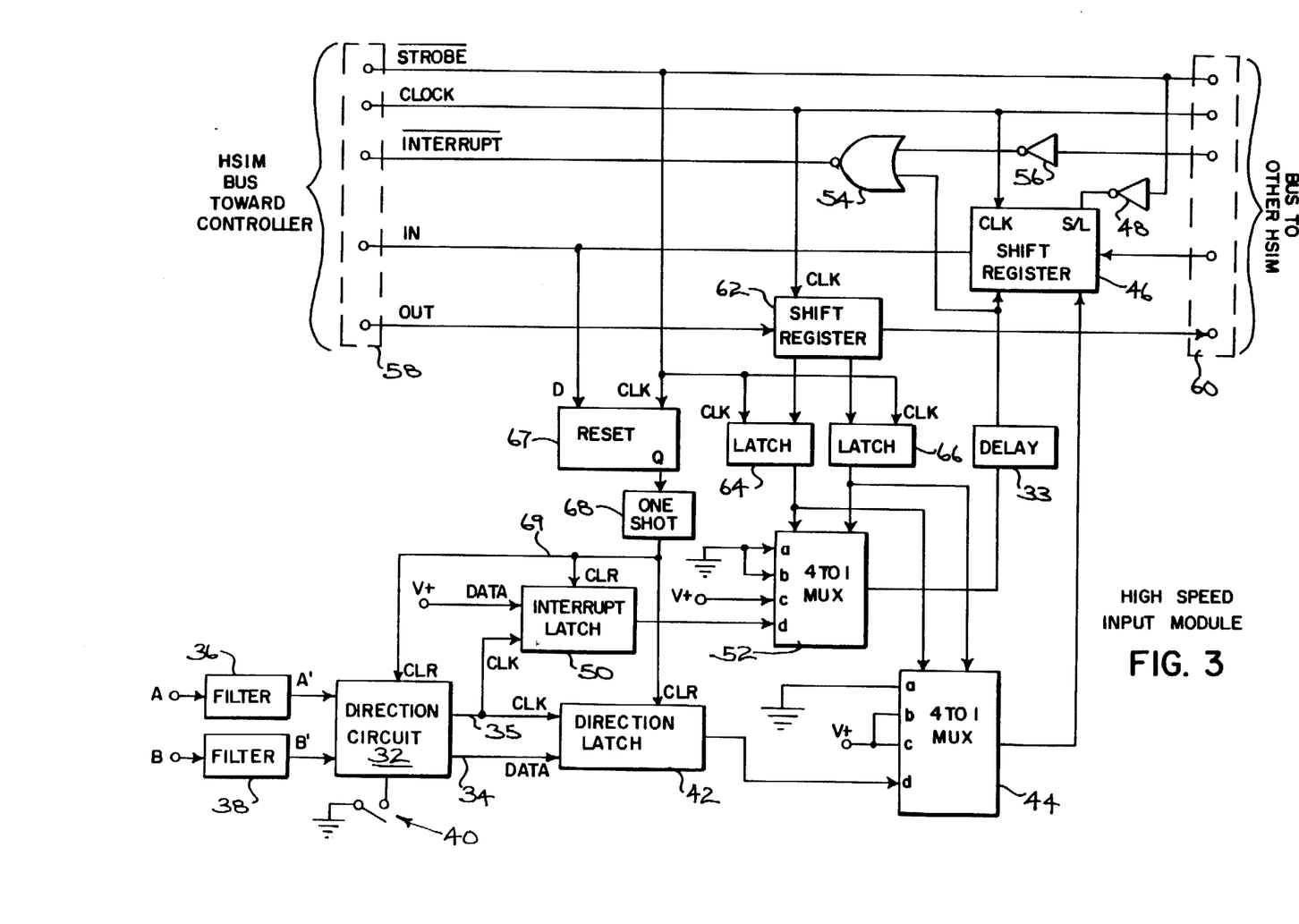
FIG. 3 is a schematic block diagram of a high-speed input module of FIG. 1.

The details of each high-speed input module are shown in FIG. 3. Each high-speed input module has a first connector 58 which in the case of the first module 14 is connected to the controller 10 and in the case of each of the other input modules 15–17 is connected to the next input module toward the controller. Each high-speed input module also has a second connector 60 which is connected to the next module which is more remote from the controller 10, in the case of HSIM's 14–16. The $\overline{\text{STROBE}}$ and CLOCK signals are directly connected between the two connectors 58 and 60. Whereas, the $\overline{\text{INTERRUPT}}$, IN and OUT lines are coupled to connectors 58 and 60 through various devices within the input module. Specifically, one input of an interrupt NOR gate 54 is connected to the output of an inverter 56 whose input is connected to the interrupt terminal on the second connector 60 of the module. The output of NOR gate 54 is connected to the interrupt terminal on the first connector 58. The coupling of the IN and OUT lines will be described in detail hereinafter.

Each high-speed input module has two device inputs, A and B, each of which may receive one of the output signals from a high-speed sensor, such as a shaft encoder (not shown). The two input lines A and B are connected to a separate filter circuit 36 and 38 respectively which electrically isolates the module from the sensor. The outputs of the filters are coupled to a direction circuit 32 which produces an output signal on line 35 indicating the occurrence of an event to be counted such as movement of the encoder shaft. The signal on a second output line 34 from this circuit 32 indicates the direction of the count (up or down) and may indicate the direction of the encoder shaft rotation. The direction circuit has two modes of operation determined by a selection switch 40. If the switch is open, the direction circuit 32 examines the phase relationship between the two signals on lines A and B and produces a high or a low voltage level on output line 34 depending upon which of the signals is leading the other. As noted above, this provides an indication of the direction in which the encoder shaft is rotating. If the switch 40 is closed, the direction circuit 32 is placed in a second mode in which it directly passes the B' input signal to output line 34 without performing a phase comparison. The two modes enable different types of sensing devices to be connected to the input module. In either mode one input signal may be thought of as indicating the occurrence of an event to count; and the other input signal may be thought of as indicating the direction of the count, either directly or by its phase relationship to the first input signal. In either mode, whenever the direction indication is valid, a high level pulse is produced on output line 35.

Figure 4:
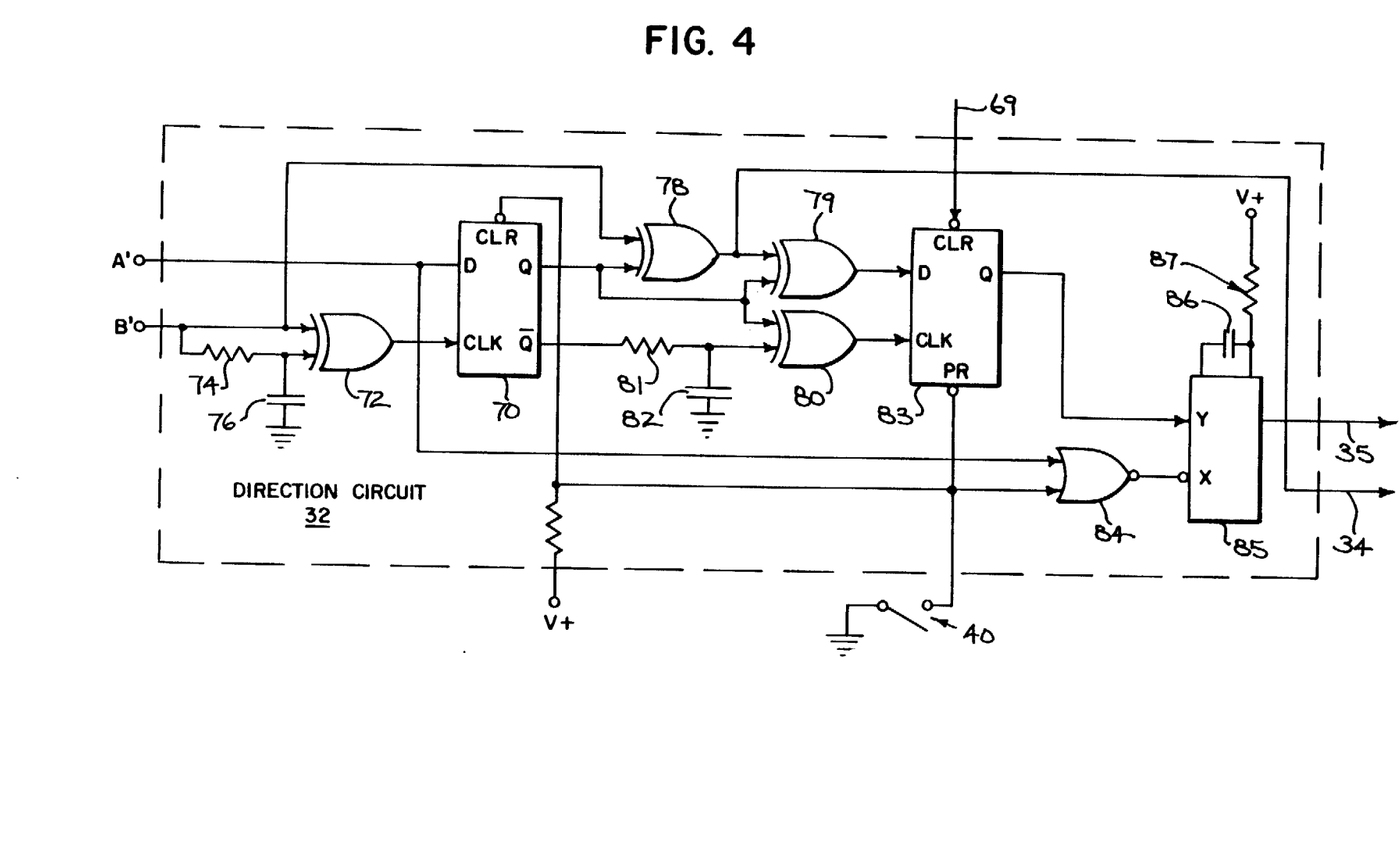
FIG. 4 is a detailed schematic diagram of the direction circuit 3.

The details of one type of circuit which may be used as the direction circuit 32 are shown in FIG. 4. The signal A' from the first filter 36 is coupled to the D input of a D-type flip-flop 70. The output signal B' from the second filter 38 is coupled to one input of a first exclusive OR (XOR) gate 72 and by a resistor 74 to the other input of gate 72. A capacitor 76 connects the other input to ground. The output of the exclusive OR gate 72 is directly connected to the clock input of flip-flop 70. The Q output of the flip-flop is connected to one input of three XOR gates 78–80. The other input of second XOR gate 78 is connected to the B' signal. The output of XOR gate 78 represents the direction output signal and is coupled to output line 34 and the other input of the third XOR gate 79. The second input to the fourth XOR gate 80 is coupled via resistor 81 to the not Q output of flip-flop 70 and via capacitor 82 to ground.

The output of XOR gate 79 connects to the D input of a second flip-flop 83 and the output of XOR gate 80 is coupled to the clock input of the second flip-flop. The preset terminal of the second flip-flop is connected to the mode switch 40 which is also connected to the clear terminal of the first flip-flop 70 and to one input of a NOR gate 84. The other input of the NOR gate receives the A' signal. The NOR gate's output is connected to the active low trigger input X of a monstable multivibrator 85. An active high trigger input Y of device 85 is coupled to the Q output of the second flip-flop 83. The duration of the monstable's output pulse on line 35 is determined by capacitor 86 and resistor 87.

The direction circuit 32 in the "encoder" mode performs quadrature detection on the sensor pulse signals A and B. In this mode a pulse indicating an event to count will be generated on line 35 upon the occurrence of either of two events. The first occurs if the A signal is low when the B input changes from low to high provided the A signal was high when the B signal previously went low. In this case a high level direction indication exists on line 34. The other event is if the A signal is high when B changes from low to high provided the A signal was low when the B signal previously went low. In this second situation a low level direction indication exists on line 34.

Returning to FIG. 3, the direction output on line 34 is fed to the data input of a direction latch 42. Line 35 carrying signals indicating an event to count extends to the clock input of the latch 42. Upon the receipt of a positive pulse on its clock input, the direction latch 42 stores the logic level at its data input representing the sensor count direction. The output from the direction latch 42 is connected to the d input of a four-to-one multiplexer 44, such as a 74HC133 integrated circuit. The a input to the first multiplexer 44 is clamped to ground and the b and c inputs are clamped to a positive voltage level. The output of the four-to-one multiplexer 44 is coupled to a parallel data input terminal of a first two-bit shift register 46. The two-bit shift register 46 may comprise any of several wellknown devices which have two shift stages capable of being parallel loaded and which have serial input and output terminals. A 74HC185 integrated circuit may be configured as such a shift register. The serial input terminal of the first shift register is connected to the IN terminal of connector 60 and its serial output is connected to the IN terminal of connector 58. The clock input of the first shift register 46 is connected to the clock line of the high-speed module bus. The shift register 46 has a terminal designated S/L which depending upon the logic level applied to it determines whether data on its parallel inputs will be latched into the register stages or whether data will be serially shifted through the device. The S/L terminal of the first shift register 46 is connected via an inverter 48 to the $\overline{\text{STROBE}}$ line of the bus.

The count output of the direction circuit 32 is also connected via line 35 to the clock input of an interrupt latch 50 having a data terminal connected directly to a positive voltage source. The rising edge of a pulse on the count output clocks a high logic level into the latch 50. The output of latch 50 is connected to the d input of a second four-to-one multiplexer 52. The c input to the second multiplexer 52 is connected to a positive voltage potential and the a and b inputs are connected to ground. The output of the second multiplexer 52 is coupled via delay circuit 33 to the other parallel input of the first shift register 46 and to the second input of interrupt NOR gate 54.

A second two-bit shift register 62 has a serial input connected to the OUT signal terminal of the first connector 58 and a serial output connected to the OUT terminal of the other connector 60. The second shift register's clock signal input terminal is connected to the clock line of the high-speed module bus. The second shift register 62 has two parallel output lines connected to different ones of first and second latches 64 and 66. The output of each of the latches 64 and 66 is connected to the selector inputs of the first and second multiplexers 44 and 52 to control which of their inputs is connected the output.

The $\overline{\text{STROBE}}$ line of the high-speed module bus is connected to the clock inputs of selector latches 64 and 66 and to the clock input of a reset flip-flop 67. The data input of the flip-flop 67 is connected to the serial output of the first shift register 46. The Q output of the reset flip-flop 67 is connected to the trigger input of a monostable multivibrator 68. The output of the one-shot 68 is connected via line 69 to the clear inputs of the direction latch 42, the interrupt latch 50 and the second flip-flop 83 in the direction circuit 32.

HSIM Operation

Each high-speed input module 14–17 has two modes of operation selected by the position of mode switch 40. If switch 40 is closed, the module is configured for counting the pulses on line A with the direction determined by the input on line B at the time the A line goes high. In this mode the sensor must provide one signal indicating the occurrence of an event to count and another signal which directly indicates the direction of the count.

In the open state of switch 40, as shown in FIG. 2, the high-speed input module is configured to decode the inputs on terminals A and B from a shaft encoder or similar device to derive the count direction. As noted previously, such encoders produce two pulsed signals which are in quadrature. By determining which one of the two signals leads the other, the direction of the shaft rotation is determined; and by counting the pulses within a given interval of time, the speed of the rotation may be calculated by the programmable controller.

Both of the encoder signals are applied to the direction circuit 32 which produces a high or low logic level on its output line 34 depending upon which of the two input signals is leading the other one. Therefore, the logic level at the output of the direction circuit indicates the rotation direction of the encoder's shaft. This level is fed to the clock input of the direction latch 42 to store the direction indication in the latch. Assuming that the interrupt latch 50 has been cleared to contain a low-logic level, the pulse on terminal A also will clock a positive value into that latch which indicates that a pulse has been received on the input to the HSIM, representing a sensor event to count. Therefore a pulse on the A terminal indicates that an event to count has occurred and a pulse on the B terminal indicates by its relationship in time to the A terminal pulse whether the count of A pulses should be incremented or decremented.

Both of the multiplexers 44 and 52 previously have been placed in a state in which the d inputs are connected to their outputs. This connects the outputs of the direction and interrupt latches 42 and 50 to the parallel inputs of the first shift register 46. The high-level in the interrupt latch 50 is also coupled through multiplexer 52 to the interrupt NOR gate 54. If either or both of the inputs of the NOR gate is at a high logic level, as presently is the case, the $\overline{\text{INTERRUPT}}$ line at terminal 58 will go low interrupting the processor 20. If the HSIM receives a low interrupt level from another HSIM via connector 60, the inverter 56 will produce a high level at the other input to the NOR gate 54 also producing an active low interrupt level at connector 58.

Upon receipt of an interrupt, the processor 20 will cause the $\overline{\text{STROBE}}$ signal to go low which when coupled through inverter 48, latches the data into first shift register 46 from its parallel inputs and places the shift register in a condition to serially shift data through it on the IN line of the HSIM bus. Then, the processor 20 sends clock pulses on the CLOCK line to serially shift the data through the first shift register 46. The number of clock pulses sent by the processor 20 is determined by the number of high-speed input modules connected to it. Specifically, the processor during system initialization determines how many HSIM's are connected to it by process to be described later. The processor then issues two clock pulses for each high-speed input module. This causes the data from each of the modules to be shifted toward processor through the intervening modules and ultimately into the processor. For example, as shown in FIG. 1, if four modules are connected, the processor will issue eight clock pulses. The data from HSIM 4 will be clocked through HSIM 3, then HSIM 2 and finally through HSIM 1 before it reaches the processor 20. If only one high-speed input module is connected in the system, the processor will issue only two clock pulses to clock the two bits of data in its shift register into the processor. Once all of the data has been clocked into the processor, the $\overline{\text{STROBE}}$ line goes high which returns shift register 46 to the parallel input mode. If an interrupt was generated at this module the high $\overline{\text{STROBE}}$ line produces an output from reset flip-flop 67 which causes the one-shot 68 to clear the direction and interrupt latches 42 and 50 and the direction circuit 32. The module is now in a condition to receive the next set of high-speed data pulses on lines A and B.

The processor upon receiving the bit pattern on its input line from the HSIM's examines the pair of bits from each HSIM. The first bit of each pair indicates whether that module has sensed the occurrence of an event to count. The second bit of the pair indicates whether the count should be incremented or decremented. For example, if the inputs to the module are from a shaft encoder, a logic one in the first bit position indicates that the shaft has moved an amount sufficient to produce an output from the encoder and the value of the second bit of the pair indicates whether the shaft has moved clockwise or counterclockwise. This enables the processor 20 to increment or decrement the count of pulses from that encoder so that it may determine the speed and position of the encoder's shaft.

As is apparent if an event occurs on any one of the four HSIM's 14 through 17 an interrupt will be sent to the processor 20. If no event to process has occurred for the other HSIM's at that point in time, the contents of the interrupt and direction latches will be zero producing a 00 bit pattern in their first shift register 46. The first zero, originating from the interrupt latch 50, indicates to the controller 10 that the corresponding HSIM did not have an event to count. The HSIM's with events to count will contain a logic one in the first bit of the pair transmitted from them.

Alternatively, the HSIM module may be used with other types of sensors than encoders. If such sensors do not produce two pulsed signals in quadrature, the direction circuit may be bypassed and the B terminal connected directly to the input of the direction latch 42. In this case, the sensor, in addition to producing a signal on the A terminal indicating the occurrence of an event, would also produce a logic level on terminal B indicating to processor 20 the direction of the count.

HSIM Initialization

Figure 5:
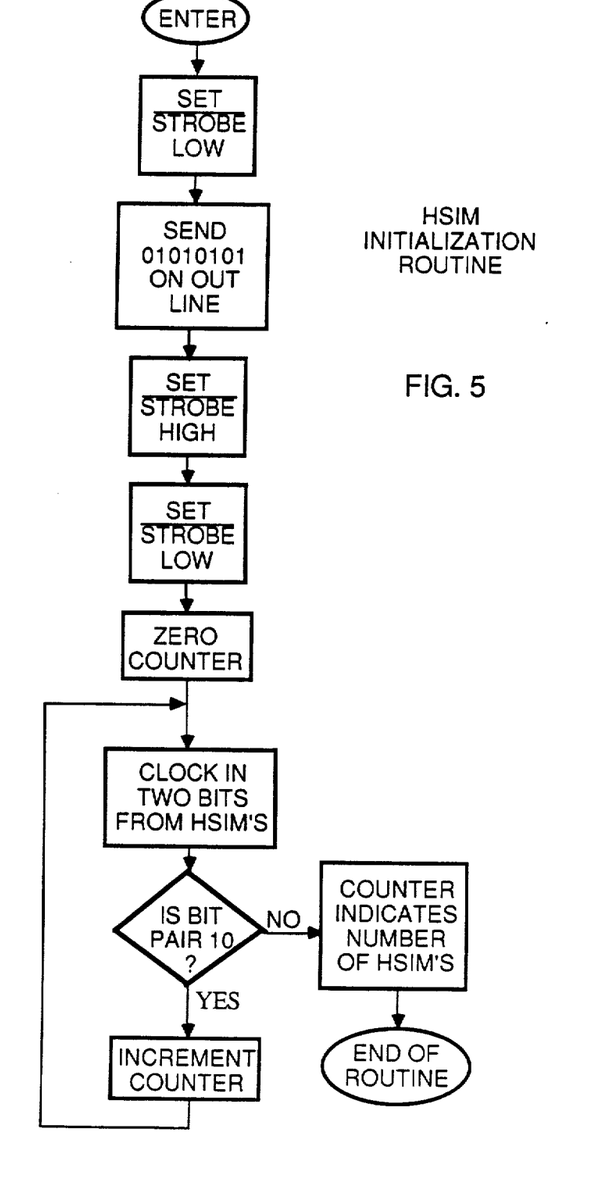
FIG. 5 is a flow chart of a program to detect the number of modules connected to the controller.

During power up or at any desirable point thereafter, the programmable controller 10 may enter a high-speed module initialization routine shown in FIG. 5 which detects the number of such modules that are connected to the system. This same routine may also be used to perform a diagnostic test to determine whether a previously functioning module has become inoperative. During this initialization sequence, a digital bit pattern is shifted out of the controller 10 on the OUT line of the high-speed module bus. In order to accomplish this, the $\overline{\text{STROBE}}$ line goes low and eight clock pulses are sent on the CLOCK line. This clocks eight bits from the controller into the second shift registers 62 of each HSIM. The pattern sent out is 01010101. If less than four modules are connected to the HSIM bus, the extra bits that are sent will be shifted out of the last module and lost. Therefore, regardless as to the number of high-speed input modules 14–17 that are actually connected to the controller 10, at the completion of the clocking signal each shift register 62 will contain a 01 bit pattern. The $\overline{\text{STROBE}}$ line then goes high which clocks the multiplexer selector latches 64 and 66 storing a zero and a one in them respectively. These bits are coupled to the four-to-one multiplexers 44 and 52 which switch the b multiplexer inputs to their respective outputs, storing a 01 pattern in the first shift register 46.

The $\overline{\text{STROBE}}$ line then goes low for a second time which places all of the first shift registers 46 into the shift mode latching the data from the multiplexers. Eight clock signals are again sent on the bus CLOCK line to shift the data through the shift registers 46 on the IN line. As the bits are received, the processor 20 examines the pair corresponding to the two bits from each possible module. For each HSIM that is connected to the system, a 01 pattern should be received. Any other pattern of bits for a given pair indicates that an HSIM is not present at that location. For example, a pattern of 01010000 indicates that there are two modules connected to the bus since the first two pairs have a 01 pattern and the last two pairs do not.

As a safeguard feature the process may be repeated by outputting a 10101010 bit pattern to the second shift registers 62 in each of the high-speed input modules. This pattern will couple the c inputs of the multiplexers 44 and 52 to their outputs, which as shown in FIG. 3 will produce a logic one from both of the multiplexers. This stores a 11 bit pattern in each of the input shift registers 46. Then the contents of each of these shift registers 46 is shifted into the processor on the IN line of the bus. Now each bit pair containing a 11 pattern indicates the presence of a high-speed input module at that location. As a further safeguard five pairs of bits could be clocked in during initialization to test for a fifth HSIM. If a fifth one is detected an error signal could be sent indicating too many modules on the system.

Once the processor 20 has determined the number of high-speed modules on the system, it will know how many pairs of sensed data bits to clock in response to an interrupt from the HSIM bus. The modules are then prepared for data sensing by outputting a pair of one bits to each of the HSIM's. This places the four-to-one multiplexers 44 and 52 in a state that couples their d inputs to their outputs connecting the outputs of the direction and interrupt latches 42 and 50 to the input shift register 46 as previously described.

It should also be noted that each time that the processor shifts data in from each of the HSIM's, it also shifts out a bit pattern into each of the second shift registers 42. Therefore, when the $\overline{\text{STROBE}}$ line goes high at the completion of the input process, thereby clocking the selector latches 64 and 66, the second shift register 62 will contain a bit pattern which selects the proper input for each of the multiplexers 44 and 52.

As noted above, when the modules receive a sensor input pulse on line A, it produces an interrupt signal to the processor 20. Periods may occur during the manufacturing process in which the inputs from a specific sensor may be ignored or a situation may arise in which a given module is producing erroneous inputs. In these instances an individual module may be disconnected from the $\overline{\text{INTERRUPT}}$ line without affecting the operation of the other modules. To accomplish this, the data shifted out of the processor to each HSIM contains a 00 bit pattern for the module to be inactivated. This pattern is then shifted into the second register 62 and stored in latches 64 and 66. The 00 bit pattern causes both of the multiplexers 44 and 52 to connect their grounded a input to the parallel inputs of the first shift register 46. This also produces a constant low logic level at the input of the interrupt NOR gate 54 which permits interrupts from other HSIM modules to be transmitted through the inactivated module. Because the two multiplexers 44 and 52 have disconnected their d input from their outputs, activity at the high-speed sensor inputs A and B to the module will not affect the operation of the programmable controller. Specifically, pulses on the A line will not produce interrupts and 00 bits shifted in from the inactive module will not trigger any program event within the controller 10.

The present invention utilizing the high-speed input modules permits the processing of sensor outputs at a much higher rate than conventional inputs to the device I/O 24 or to the device expansion module 18 which typically operate at the power line frequency. Although the actual rate of data input is dependent upon the clock frequency of the processor 20, inputs occurring at 6,000 times per second may easily be processed via the high-speed input modules employing the interrupt technique. The instant system also utilizes a simplified technique for serially sending sensed data from a number of modules to a single input of the controller.

What is claimed:

1. An input module for a programmable controller which has an interrupt input, a clock output, a serial data input and a serial data output, said input module comprising:

a first input terminal for receiving a signal indicating the occurrence of an event to count;

a second input terminal for receiving a signal indicating whether the count is to be incremented or decremented;

first and second output terminals, said first output terminal for transmitting a signal to the interrupt input of the controller and said second output terminal for transmitting data to the serial input of the controller;

means for connecting the first input terminal to the first output terminal, and having means for receiving a first signal from another input module and coupling the first signal to said first output terminal;

means coupled to said second input terminal for storing the indication of whether the count is to be incremented or decremented; and means for transmitting the indication from said means for storing to the second output terminal in response to a signal from the clock output of the controller, and having means for receiving a second signal from another input module and coupling the second signal to said second output terminal.

2. The input module as in claim 1 wherein said means for connecting the first input terminal to the first output terminal comprises a first latch for temporarily storing an indication of the occurrence of an event to count, the output of said first latch being coupled to the interrupt input of the programmable controller.

3. The input module as in claim 1 wherein the means for transmitting the indication from the storing means to the second output terminal comprises a shift register having a serial output connected to said second output terminal, and also having a parallel input connected to the output of the storing means, said shift register shifting data to its output in response to the clock output of the controller.

4. The input module as recited in claim 1 further comprising means, responsive to a given signal from the programmable controller, for applying a predefined signal to said second output terminal.

5. A control system comprising:

a processor module having a microprocessor and a serial input/output port;

a bidirectional serial communication link coupled to the serial input/output port and having a clock signal conductor, an interrupt signal conductor, a data output conductor and a data input conductor; and an input module connected to the processor module by the serial communication link, said input module having:

(a) a first input for receiving a first indication of an occurrence of an event to count, (b) a second input for receiving a second indication of whether a count of events is to be incremented or decremented, (c) means, responsive to the first indication, for sending an interrupt signal over the interrupt signal conductor, (d) means for sending data over the data input conductor in response to a signal on the clock signal conductor, wherein said data includes an indication of whether a count of events is to be incremented to decremented, and (e) means, responsive to a given signal on the data output conductor, for sending a predefined multi-bit signal over the data input conductor, at least one of the bits of the predefined signal having a non-zero logic level.

6. The control system as recited in claim 5 wherein said processor module further includes means for transmitting the given signal on the data output conductor, the given signal having a plurality of bits determined by a maximum number of input modules which can be simultaneously connected to the serial communication link.

7. The control system as recited in claim 5 wherein said means for sending data over the data input conductor transmits data indicating the occurrence of an event to count in series with the indication of whether a count of events is to be incremented or decremented.

8. The control system as recited in claim 5 wherein said means for sending data over the data input conductor further includes means for receiving a data signal from another input module and sending such data signal over the input data conductor; and wherein said input module further includes means for receiving an interrupt signal from another input module and sending such interrupt signal over the interrupt signal conductor.

9. An input module for a programmable controller which has an interrupt input, a clock output, a serial data input and a serial data output, said input module comprising:

a first input terminal for receiving a signal indicating the occurrence of an event to count;

a second input terminal for receiving a signal indicating whether the count is to be incremented or decremented;

first and second output terminals, said first output terminal for transmitting a signal to the interrupt input of the controller and said second output terminal for transmitting data to the serial input of the controller;

means for connecting the first input terminal to the first output terminal;

means coupled to said second input terminal for storing the indication of whether the count is to be incremented or decremented; and means for transmitting the indication from said means for storing to the second output terminal in response to a signal from the clock output of the controller, said means for transmitting including a first shift register having two stages each with a parallel input terminal and having a serial output terminal connected to the second output terminal, and said means for transmitting also including a first means for coupling the indication from said means for storing to one of the parallel input terminals for one stage of said shift register.

10. The input module as in claim 9 wherein the first means for coupling includes a first multiplexer having an input terminal connected to said storing means to receive the indication therefrom, and having an output terminal connected to the parallel input terminal for the one stage of said shift register.

11. The input module as in claim 10 wherein said means for connecting the first input terminal to the first output terminal comprises:

a data latch having an input connected to the first input terminal and having an output; and second means for coupling the output of said latch to the first output terminal.

12. The input module as in claim 11 wherein said second means for coupling the output of said latch to the first output terminal comprises:

a second multiplexer having an input terminal connected to the output terminal of said latch, and having an output terminal; and a logic gate having one input terminal connected to the output of said second multiplexer, and having an output terminal coupled to the first output terminal.

13. The input module as in claim 12 further including means for coupling the output of the second multiplexer to the parallel input for the other stage of said first shift register.

14. The input module as in claim 12 further comprising:

a second shift register having an input terminal for receiving the clock output of the controller, a serial data input terminal for receiving the serial output of the controller and two stages each having a parallel output terminal; and means for connecting each of the parallel output terminals to selector input terminals of each of the first and second multiplexers.

* * * * *